3,122,584
PRODUCTION OF AMMONIUM FORMATE
Fred L. Kelly, Chesterfield, and Charles H. Cuthbert, Petersburg, Va., assignors to Allied Chemical Corporation, New York, N.Y., a corporation of New York
No Drawing. Filed Nov. 8, 1960, Ser. No. 67,900
8 Claims. (Cl. 260—542)

This invention relates to a process for producing ammonium formate, a material useful, inter alia, as an antiseptic and as a source of nitrogen in animal feeds.

The preparation of ammonium formate by the reaction of formic acid with ammonia is known. Formic acid suitable for use in such reaction is produced by reacting carbon monoxide and caustic soda to produce sodium formate, and acidifying the latter material with sulfuric acid to produce the formic acid, which can be distilled off. Alternatively formic acid may be produced by saponification of formic acid esters with aqueous alkalies followed by acidification of the alkali salt thus produced with a mineral acid. Both of these methods for the production of formic acid involve large consumption of relatively expensive alkalies and mineral acids. Hence the reaction of formic acid with ammonia to form ammonium formate is economically unattractive.

It is also known to prepare formic acid by the hydrolysis of methyl formate in an aqueous mixture maintained under acid conditions to produce methanol and formic acid. In this process, however, the hydrolysis reaction is incomplete since an equilibrium exists which depends essentially on the ratio of the methyl formate to the water present, the reaction only going to substantial completion in the presence of very large molar excesses of water. Moreover, it is not possible to completely recover the methanol and formic acid produced in the hydrolysis reaction by conventional fractionation procedures; the methanol and formic acid tend to be re-esterified during the distillation as the unhydrolyzed methyl formate is removed from the equilibrium mixture of methyl formate, methanol and formic acid. Hence a relatively low yield of formic acid is produced in this process, rendering it also economically unattractive.

It has also been suggested to react methyl formate and ammonia directly to produce formamide; when water is present during this reaction a mixture of formamide and ammonium formate is obtained. Under certain conditions more formamide than ammonium formate is produced by this reaction. Moreover it is difficult to effect separation of the ammonium formate from the formamide, and the formamide is an undesirable contaminant of the ammonium formate thus produced.

It is among the objects of this invention to provide a process for the production of ammonium formate from methyl formate in high yield which is simple and economical to perform.

It is a further object of the invention to provide such a process which does not produce contaminating by-products such as formamide which decrease the yield of ammonium formate and introduce purification problems.

It is still another object of this invention to provide such process in which methanol is the only by-product formed and no undesired by-products are produced.

Other objects and advantages of the present invention will be apparent from the following detailed description thereof.

In accordance with this invention, methyl formate is hydrolyzed in an aqueous acidic medium containing an acid catalyst, and ammonia is added to the hydrolysis reaction mixture, desirably during the course of the hydrolysis reaction mixture, desirably during the course of the hydrolysis while maintaining the mixture at a pH not exceeding about 4.5, to produce a reaction mixture in which at least the major portion of the methyl formate is converted to ammonium formate and methanol. The ammonium formate is recovered from the reaction mixture thus formed.

Surprisingly, it has been found that by adding ammonia to the hydrolysis reaction mixture while maintaining the mixture at a pH not exceeding about 4.5, high yields of ammonium formate are produced without the production of contaminating amounts of formamide. It is believed that the reaction with ammonia at or below a pH of about 4.5 affects the equilibrium of the overall saponification reaction and tends to produce greater concentrations of the ammonium formate product. Thus, the hydrolysis proceeds readily with a relatively small amount of water present compared to previously known acidic hydrolysis procedures. Moreover, maintaining the reaction mixture at a pH not exceeding about 4.5 minimizes, if not substantially completely prevents, the formation of formamide, which results from complete neutralization of the hydrolysis reaction mixture with ammonia, and which decreases the yield of ammonium formate and introduces purification problems. It will, of course, be understood that the above explanation is given to facilitate a better understanding of the invention and is not intended as limiting its scope.

The process of this invention may be carried out batchwise or continuously, as desired. It is preferred to operate continuously as, for example, by continuously feeding an aqueous mixture containing methyl formate and an acid catalyst into a pot or tubular reactor, adding sufficient ammonia to this hydrolysis reaction mixture to convert most of the formic acid formed to ammonium formate while maintaining the reaction mixture at a pH not exceeding about 4.5, continuing the addition of the ammonia, i.e., the saponification reaction, until at least a major portion of the methyl formate is converted to ammonium formate, flash evaporating the resultant reaction mixture to remove quickly the unreacted methyl formate and the methanol produced in the saponification, neutralizing the residual acidic ammonium formate solution with ammonia, evaporating the resultant solution to separate the ammonium formate, and utilizing the methyl formate separated in the flash evaporation step to produce additional methanol and ammonium formate.

In batch operations, the acidic catalyst is fed with the hydrolysis reactants into the reaction system. The residual acidic portion of one saponification batch may be used to initially acidify another batch.

The hydrolysis mixture desirably contains from about 3 to about 10 mols of water per mol of the formate. Use of less than about 10 mols of water per mol of the formate ester is advantageous from the economic viewpoint since excess water must be evaporated from the ammonium formate product. However, some excess water is desirable for maintaining the reactants in solution and because such excess facilitates carrying out the hydrolysis reaction. Preferably from about 3 to 7 mols of water per mol of methyl formate are utilized in the reaction mixture.

The hydrolysis reaction is carried out under acid conditions in the presence of an acid catalyst. The pH of the reaction mixture, during the initial mixing of the methyl formate with the acid is not critical. The hydrolysis proceeds faster at higher acid concentrations, but this is not controlling because the reaction mixture rapidly becomes more acidic during the hydrolysis due to formation of formic acid; little formic acid is required to lower the pH to below 4.5. Preferably, the pH of the reaction mixture is maintained below about 3, most desirably between about 1 and 3 throughout the reaction. Strong acids such as formic, sulfuric, hydrochloric or nitric acids are used as the acid catalysts; formic acid is preferred because no other ions are thereby introduced into the reacting system which affect the purity of the ammonium formate product.

Using formic acid as the acid catalyst, a portion of a hydrolysis batch may be separated and used to provide the formic acid content to acidify another batch. Using this procedure the formic acid formed in the hydrolysis is employed to provide the acid catalyst and, hence, it is not necessary to obtain formic acid from an extraneous source. A portion of the partly neutralized hydrolysis mixture may be employed to furnish the acid for a new batch. In continuous operation, a recycle stream from the bottom of the column in which the hydrolysis and saponification takes place may be used to furnish all or part of the acid required for the initial acidification.

Still another procedure is to hydrolyze the methyl formate in an aqueous acidic medium, add ammonia to the hydrolysis reaction mixture, while maintaining the solution at a pH not exceeding about 4.5, separate ammonium formate from the acidic solution by a concentration and crystallization procedure without further neutralization and utilize the residual acidic filtrate from the concentration and crystallization procedure to acidify another batch.

As the hydrolysis proceeds, formic acid and methanol are formed within the acidic reaction mixture. Ammonia is added to this mixture, preferably during the course of the hydrolysis. The reaction between water and methyl formate to form methyl alcohol and formic acid does not go to completion. It is a reversible reaction which reaches equilibrium. The ammonia may be added at any point up to or before the equilibrium point is reached. The rate and amount of ammonia addition is controlled by measuring the acidity of the reaction mixture, and adding ammonia limited in amount to maintain the pH of the mixture at not exceeding about 4.5, preferably within the range of pH of from about 1 to 3. It will be understood that, as additional formic acid is formed by the hydrolysis reaction, the reaction mixture becomes more acid and additional ammonia is added to react with the formic acid to form ammonium formate but insufficient to cause a rise of pH above about 4.5. Surprisingly, under these conditions ammonium formate is produced without the concomitant production of formamide contaminant.

Desirably, the ammonia is sparged into the reaction mixture to avoid large localized concentrations of ammonia in the acidic mixture. While the ammonia may be introduced in either anhydrous form or as an aqueous solution, it is preferred to employ anhydrous ammonia to avoid the introduction of unnecessary water into the reaction system, which must later be evaporated from the ammonium formate product.

The reactions are continued until at least the major portion of the methyl formate is converted to ammonium formate and methanol. Reaction times vary inversely with reaction temperatures to produce a given percentage conversion of the methyl formate; the reaction is carried to 70% conversion within four hours at 50° C. and is carried to 70% conversion within one hour at 70° C. It is preferred to maintain the reaction mixture at a temperature within the range of from about 50° to about 100° C. in order to produce the desired conversion of more than 50% of the methyl formate, preferably from 60% to 70%, within reaction periods of from about 0.2 to 4 hours.

Methyl formate boils at 32° C. Operating under atmospheric pressure conditions, a reflux condenser is used to return the methyl formate to the reaction mixture. Alternatively the reaction is carried out in a closed reaction system operating under super-atmospheric pressure, preferably at from about 20 to 200 p.s.i.g.

The reaction mixture, thus produced, contains ammonium formate, methanol, unreacted methyl formate, and small amounts of formic acid. In order to separate the ammonium formate from this reaction mixture, the methanol and unreacted methyl formate are flashed from the aqueous mixture. Such flashing is carried out in any suitable flash evaporator, such as a conventional heater and flash-box, a falling film, Turba-Film or Rota-Vac flash evaporator. The evaporation is conducted in one or two stages, as desired; however, it is important to distill the methanol from the reaction mixture promptly after the unreacted methyl formate has distilled off in order to prevent or at least minimize the re-esterification thereof. For this purpose, the reaction product is successively passed through two flash evaporation stages, in the first of which unreacted methyl formate is evaporated, and in the second of which methanol is evaporated, leaving a residual acidic aqueous solution of ammonium formate. Alternatively, a single flash evaporation step may be employed to evaporate both the unreacted methyl formate and methanol, and the methyl formate then distilled from the methanol. During distillation the pH is desirably maintained at not exceeding 4.5, preferably from 1 to 3, until after the unreacted methyl formate is distilled from the reaction mixture; by so doing formation of formamide is minimized, if not completely prevented.

The unreacted methyl formate recovered from the ammonium formate reaction product is recycled to the hydrolysis reaction mixture for reaction as hereinabove described to produce ammonium formate and methanol. The methanol flashed from the reaction product is a useful by-product.

Ammonium formate may be recovered from the residual acidic aqueous solution by evaporation to dryness, normally under reduced pressure, or by evaporation to form a slurry containing crystalline ammonium formate which is separated by filtration. The acidic filtrate may be recycled to the hydrolysis step. In order to better purify the ammonium formate product, the residual acidic solution thereof is preferably neutralized with ammonia to a pH of about 7 and water is then evaporated therefrom, leaving a slurry containing crystalline ammonium formate. The crystalline ammonium formate is recovered by centrifugation or filtration, and is dried at temperatures below 180° C., its decomposition temperature. Filtrate is recycled to the evaporator. Product yields of the order of about 98% of theory, based on the methyl formate consumed in the process, have been thus obtained.

If desired, overhead water vapor from the ammonium formate evaporator may be condensed and recycled to the hydrolysis reaction mixture, and the filtrate remaining after the separation of the crystalline ammonium formate may be, in turn, recycled to the aforesaid evaporator.

The following examples illustrate the process of this invention; it will be understood the invention is not limited to these examples. In the examples, all parts are given on a weight basis.

EXAMPLE I

*Continuous Process*

The parts given in this example are parts per hour.

Methyl formate in the amount of 1946 parts was continuously introduced into the top of a flooded packed column. It was there mixed with a recycle stream from the bottom of the column containing unreacted methyl formate, formic acid, water, methanol and ammonium formate. Make-up water in the amount of 5400 parts, 2 parts of formic acid, to adjust the pH of the mixture to 3, was added at the top of the column together with a recycle stream from the flash evaporator, which stream contained 757 parts of unreacted methyl formate and 251 parts of methanol.

The methyl formate was slowly hydrolyzed as it passed down the column. 506 parts of ammonia were injected into the reaction mixture during the hydrolysis to react with the formic acid as formed. The rate of ammonia addition was controlled to maintain a pH of 3 in the acidic effluent from the bottom of the column. The reaction mixture in the column was maintained at 50° C. for 4 hours, after which time 70% conversion to ammonium formate had been effected, and 1879 parts of ammonium formate had been formed.

The acidic effluent from the bottom of the column was cooled and the portion referred to above recycled to the top of the column. The remaining portion (8860 parts) was passed to a falling film evaporator operating at a head temperature of about 40° C. where the unreacted methyl formate (757 parts) was recovered together with some of the methanol (251 parts). The bottoms from this column were sent immediately to a second falling film evaporator operated at a head temperature of 65–75° C. where the remaining methanol (1016 parts) was distilled off. The total time for distillation of the methyl formate and methanol was less than one minute. Methanol recovered in the second falling film evaporator contained a small percentage of methyl formate and a trace of water.

The bottoms from the second flash evaporator were neutralized with an injection of 33 parts of ammonia and the essentially neutral solution of ammonium formate and water was then evaporated in a conventional evaporator to provide an ammonium formate slurry containing 30% solid ammonium formate. Crystalline ammonium formate was recovered from the evaporator slurry by centrifugation and was then dried at 110° C. The filtrate was recycled to the evaporator to recover additional ammonium formate. A total of 2000 parts of ammonium formate was thus obtained. The water taken overhead from the evaporator (4785 parts) was condensed and returned along with the methyl formate-methanol mixture from the first flash evaporator to the top of the packed reaction column.

Overall yield of ammonium formate was 98% based on the methyl formate consumed. Essentially no formamide was produced.

EXAMPLE II

*Batch Process*

Methyl formate (100 parts) was introduced into a closed stirred pot reactor maintained at 70° C. together with 100 parts of water, and about 0.1 part of formic acid was added to adjust the pH of the reaction mixture to 2.5.

As the methyl formate slowly hydrolyzed, 20 parts of ammonia were added at such a rate as to maintain the pH between 2 and 3. Saponification was 70% complete in one hour.

The acidic effluent from the pot reactor was flash evaporated in a single falling film evaporator operated at a head temperature of 90° C. The unreacted methyl formate and methanol by-product were separated within 10 seconds. The unreacted methyl formate was then separated from the methanol by simple distillation and the methyl formate recycled as part of the feed to the pot reactor.

The acidic ammonium formate solution from the flash evaporator was neutralized with ammonia and further evaporated as described in Example I to separate ammonium formate.

Yield was 98% of ammonium formate, based on the methyl formate consumed, with recycle of less than 28% methyl formate. Essentially no formamide was produced.

EXAMPLE III

*Batch Process*

Methyl formate (19.5 parts) was introduced into a closed pot reactor maintained at 50° C. together with 40.36 parts of water and 0.05 part of 0.1 normal HCl. The reaction mixture was mixed, then allowed to stand at 50° C. for 2 hours. Analysis of a sample of the reaction mixture indicated that 44.6% of the methyl formate was hydrolyzed at this point.

About 2.45 parts of ammonia was added to adjust the pH of the reaction mixture to about 4. After standing about 5 hours, analysis of a portion of the acidic mixture showed that about 70% of the initial methyl formate had been hydrolyzed. 1.4 parts of ammonia was then added to adjust the pH to about 4.

The acidic effluent from the pot reactor was then evaporated using a one plate column; the unreacted methyl formate distilled first at overhead temperatures of 32–40° C.; a methyl alcohol fraction was distilled at overhead temperatures of 51–90° C.

The residual acidic ammonium formate solution from the evaporation was further evaporated to provide a slurry containing about 30% solid ammonium formate. The crystalline ammonium formate was recovered from the evaporator slurry by centrifugation. A portion of the acidic filtrate was recycled to the pot reactor to acidify another batch. The product ammonium formate was dried at 110° C. and was found to contain essentially no formamide.

It will be noted that the present invention provides a simple and economical process for the production of ammonium formate in high yield and free from formamide containment.

Since different embodiments of the invention may be made without departing from the scope thereof, it is intended that all matter contained in the above description shall be interpreted as illustrative and not in a limiting sense. Thus, for example, while an important feature of the invention is the maintenance of the pH during the saponification of the hydrolysis reaction mixture at not exceeding about 4.5, it will be appreciated that momentarily, say during the initial addition of ammonia or of increments of ammonia to the hydrolysis reaction the pH may rise above 4.5, say to about 6 and the pH remain above 4.5 only for a relatively short period of time after each such addition of ammonia.

What is claimed is:

1. A process for producing ammonium formate, comprising hydrolyzing methyl formate in an aqueous medium containing a strong acid catalyst, adding ammonia to the hydrolysis reaction mixture while maintaining the mixture at a pH not exceeding about 4.5 to produce a reaction mixture containing ammonium formate and methanol and free of contaminating by-products, and separating the ammonium formate from said reaction mixture.

2. The process as defined in claim 1, in which said reaction mixture is evaporated to remove any unreacted methyl formate and methanol overhead while leaving a residual acidic mixture containing ammonium formate, said residual mixture is neutralized with ammonia and the neutralized mixture is evaporated to recover the ammonium formate.

3. The process as defined in claim 1, in which said strong acid catalyst is selected from the group consisting of formic, sulfuric, hydrochloric and nitric acids.

4. A process for producing ammonium formate comprising the steps of hydrolyzing methyl formate in an aqueous mixture containing from 3 to 10 mols of water per mol of methyl formate and a strong acid catalyst in an amount sufficient to impart to said mixture a pH not exceeding about 4.5, adding ammonia to the hydrolysis reaction mixture during the course of the hydrolysis while maintaining the pH not exceeding 4.5 to produce a reaction mixture free of contaminating by-products and in which at least the major portion of said methyl formate has been converted to ammonium formate and methanol, and separating the ammonium formate from said reaction mixture.

5. The process defined in claim 4, in which the ammonium formate is separated from said reaction mixture by evaporating said mixture to remove unreacted methyl formate and methanol overhead while leaving a residual acidic mixture containing ammonium formate, neutralizing said residual mixture with ammonia and evaporating the neutralized mixture to recover the ammonium formate.

6. A process for producing ammonium formate by the saponification of methyl formate, comprising the steps of (1) hydrolyzing methyl formate in an aqueous mixture containing from 3 to 10 mols of water per mol of methyl formate and a strong acid catalyst in amount sufficient to adjust the pH of said mixture to between 1 and 3; (2) adding ammonia to the hydrolysis reaction mixture during the course of the hydrolysis to react with formic acid formed during said hydrolysis; (3) continuing said hydrolysis and addition of ammonia while maintaining the pH of said mixture between 1 and 3 to produce a reaction mixture free of contaminating by-products and in which at least the major portion of said methyl formate has been converted to ammonium formate and methanol; (4) evaporating said reaction mixture to remove unreacted methyl formate and methanol overhead while leaving a residual acidic mixture containing ammonium formate; and (5) neutralizing and evaporating said residual acidic mixture to recover the ammonium formate.

7. A process for producing ammonium formate by the saponification of methyl formate, comprising the steps of (1) hydrolyzing at a temperature of from 50° to 100° C. methyl formate in an aqueous mixture containing from 3 to 10 mols of water per mol of methyl formate and sufficient formic acid to adjust the pH of said mixture to between 1 and 3; (2) adding ammonia to the hydrolysis reaction mixture during the course of the hydrolysis while maintaining the pH between 1 and 3 and the temperature of said mixture between 50° and 100° C. to produce a reaction mixture free of contaminating by-products and in which at least the major portion of said methyl formate has been converted to ammonium formate and methanol; (3) evaporating said reaction mixture to remove unreacted methyl formate and methanol overhead while leaving a residual acidic mixture containing ammonium formate; (4) recycling unreacted methyl formate from step (3) to step (1); (5) neutralizing said residual acidic mixture with ammonia; and (6) evaporating the neutralized mixture to recover the ammonium formate.

8. The process as defined in claim 7, in which unreacted methyl formate and methanol in step (3) are removed from the reaction mixture by flash evaporation.

References Cited in the file of this patent

UNITED STATES PATENTS

| | | |
|---|---|---|
| 2,070,503 | Ammon | Feb. 9, 1937 |
| 2,160,064 | Eversole | May 30, 1939 |
| 2,373,583 | Loder | Apr. 10, 1945 |

FOREIGN PATENTS

| | | |
|---|---|---|
| 438,796 | Great Britain | Nov. 18, 1935 |

UNITED STATES PATENT OFFICE
CERTIFICATE OF CORRECTION

Patent No. 3,122,584                  February 25, 1964

Fred L. Kelly et al.

It is hereby certified that error appears in the above numbered patent requiring correction and that the said Letters Patent should read as corrected below.

Column 1, lines 69 and 70, strike out "desirably during the course of the hydrolysis reaction mixture,"; column 4, line 65, before "2" insert -- and --.

Signed and sealed this 7th day of July 1964.

(SEAL)
Attest:

ERNEST W. SWIDER
Attesting Officer

EDWARD J. BRENNER
Commissioner of Patents